PATENTED AUG 31 1971
3,602,046
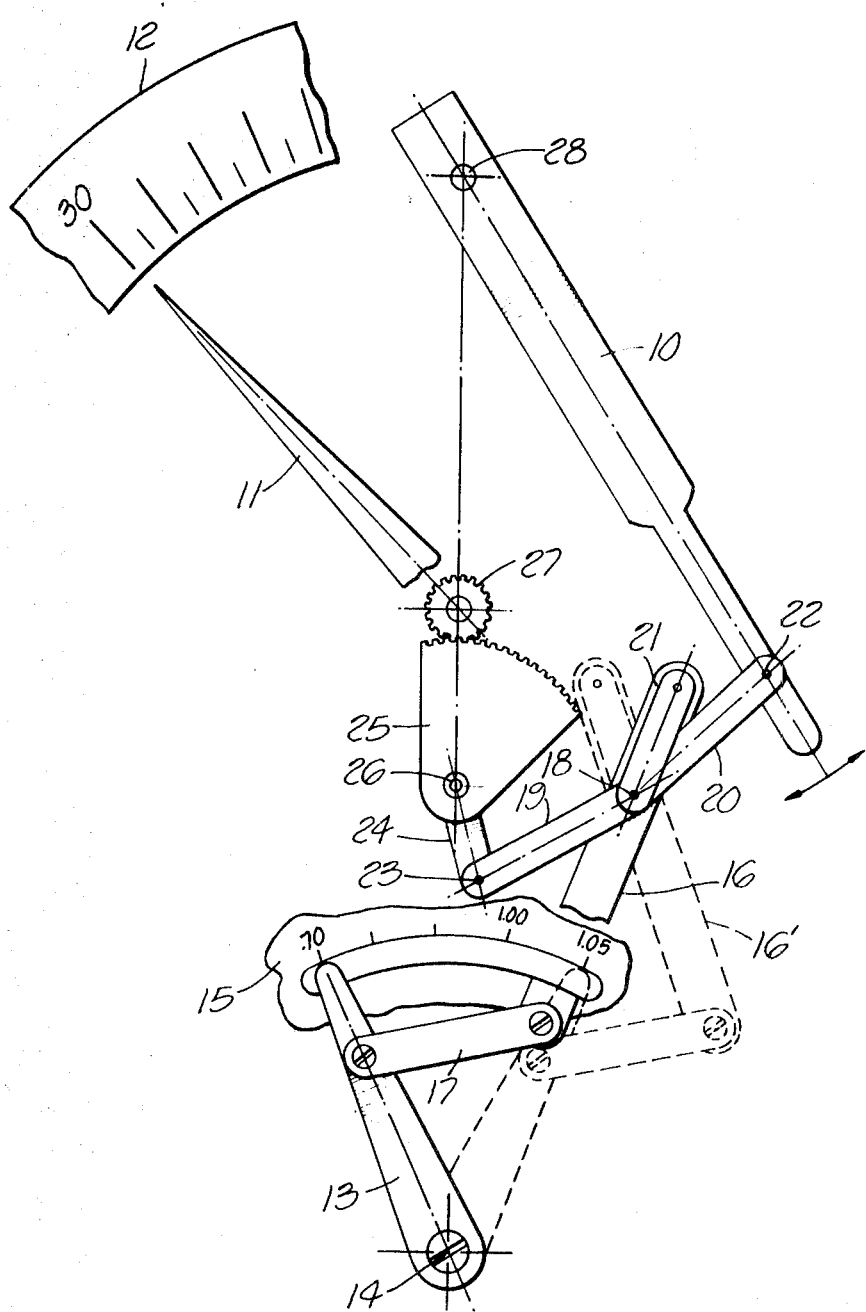
INVENTORS.
V. LAWFORD
A. DE ROSA
BY
[signature]
ATTORNEY

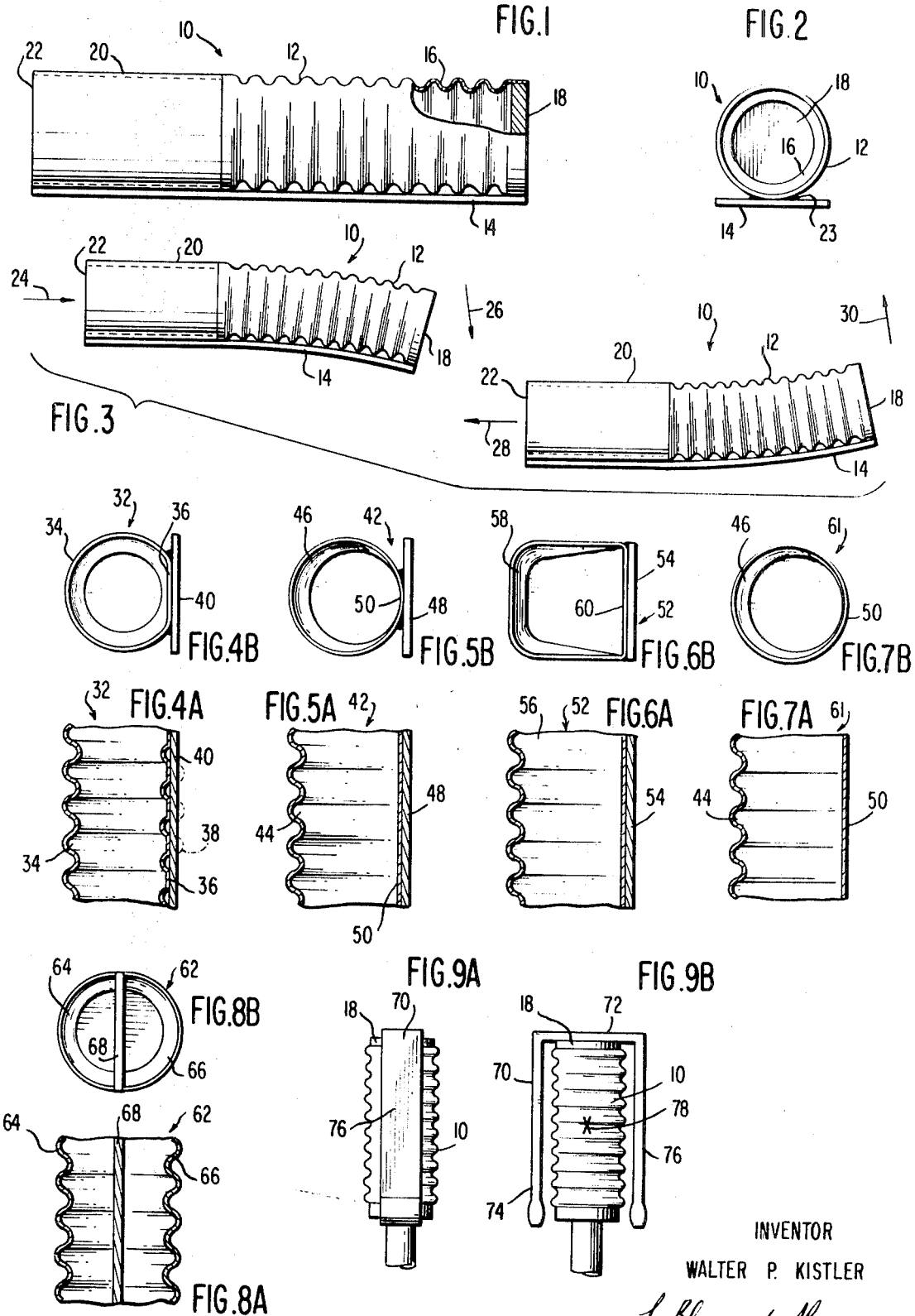

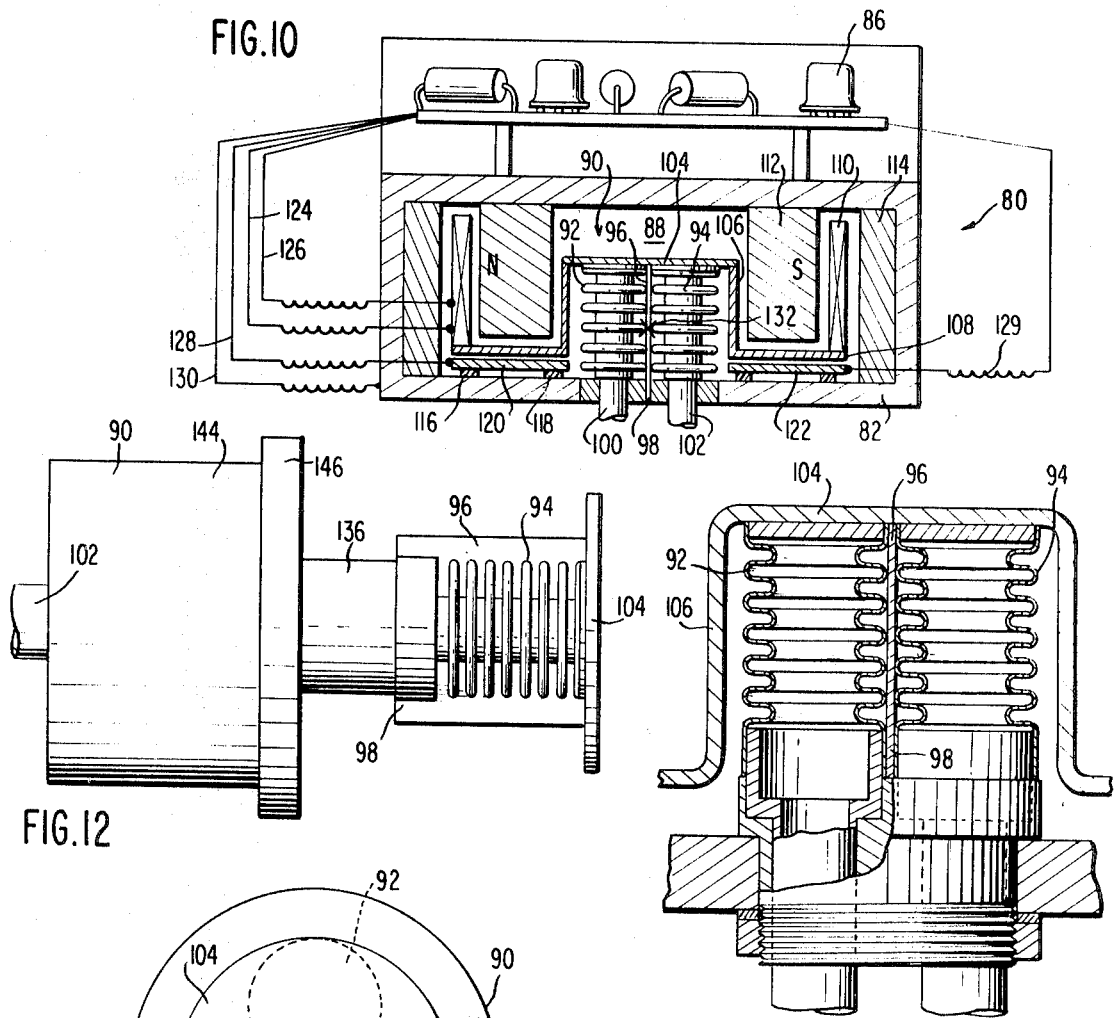
FIG.10
FIG.12
FIG.11
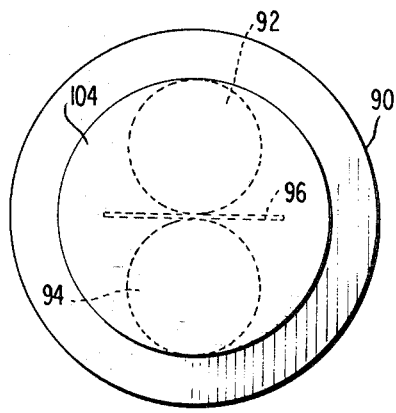
FIG.14
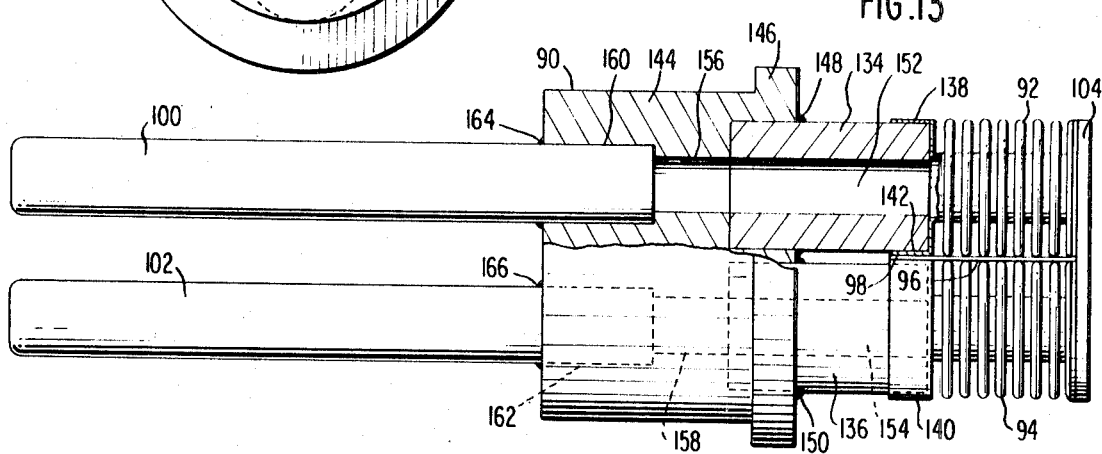
FIG.13

`3,602,047`

SERVO PRESSURE TRANSDUCER

This application is a continuation-in-part of copending application, Ser. No. 812,193, filed Apr. 1, 1969.

This invention relates to pressure transducers and more particularly to an improved servo pressure transducer having increased sensitivity and a wide operating range. The transducer of the present invention is capable of measuring pressure differences of as little as a few millions of an atmosphere while capable of withstanding internal pressures of as many as several tens of atmospheres.

The transducing element takes the form of a pressure-sensitive beam which bends when pressure is applied to it. The beam consists of a thin flat strap or strip of flexible metal attached to one or more bellows each open at one end and closed at the other. When a pressure fluid is applied to the open end of the bellows, the pressure-sensitive beam bends in a direction away from the bellows. If an underpressure or vacuum is applied to the bellows, the beam bends in the opposite direction. In a symmetrical arrangement with two bellows over or under pressure can be applied in either bellows making the device bend toward the side of lower pressure.

Mechanical pressure-sensing devices or transducers currently in use take a variety of forms. Among the most frequently used are the Bourdon tube, the bellows, and the pressure-sensitive diaphragm. The Bourdon tube is probably the best known and most used pressure-sensing device today. Basically, it consists of a curved flat tube which acts like a coiled spring and stretches when pressure is applied. A mechanical display (pointer) or an electrical sensor is customarily actuated by it. However, the Bourdon tube does not indicate pressure directly but it instead converts pressure into displacement. Furthermore, the useful dynamic range of the Bourdon tube is severely limited due to the fact that the pressure-sensing element and the counteracting spring are the same part. The Bourdon tube cannot be used to measure differential pressure.

A second well-known pressure-sensing device is the conventional bellows and by using a separate bellows and counteracting spring the dynamic range of a bellows can be substantially increased. Such arrangements are used in highly precise force balance pressure transducers. Through the use of two counteracting bellows, differential pressure can be measured. However, if the bellows is held at both ends, only a bellows having a length shorter than its diameter can be used since the bellows tends to buckle under internal pressure thus limiting the flexibility that can be obtained. In addition, because the bellows generates a linear displacement, it is highly acceleration sensitive.

Metal diaphragms are frequently used but only in an extremely limited displacement and are therefore only used in special applications, such as fast-response dynamic gauges. Plastic diaphragms can be used to give larger displacements but cannot be used for precision measuring instruments.

The pressure-sensitive beam of the present invention offers significant advantages over the above constructions. It can be made extremely flexible and will still resist very high pressures thus making it possible to design an instrument that will respond to small fractions of a p.s.i. while still being able to measure several hundred p.s.i. The bending beam does not show the limitation of the straight bellows which tend to buckle under high internal pressure and since it generates a bending motion rather than a linear displacement it is less acceleration sensitive than a straight bellows. A symmetrical arrangement with a double bellows represents an ideal differential pressure sensor. It remains straight even when high pressures are applied at the two inlets as long as those pressures are equal. If only a very slight difference between the two pressures exists, the sensitive beam readily deflects because of its great flexibility. The pressure-sensitive beam can be incorporated in a feedback or servo loop to directly convert pressure into force rather than into displacement as with the Bourdon tube and with the other prior constructions.

According to a preferred embodiment of the present invention, a double-bellows or differential-type bending beam is attached at one end to a movable plate forming part of a capacitive pickoff. Mounted on the movable plate is an annular coil which moves with the plate but is positioned in the field of a permanent magnet so as to generate a restoring force opposing the force exerted by the bending beam. The annular coil or forcer coil is connected through an electrical circuit to a capacitive pickoff which includes the movable plate on which the coil is mounted such that the coil forms a part of an electronic feedback circuit or servo loop and the amount of current flowing through the coil in opposition to the force of the bending beam is an indication of the pressure of the fluid within the bellows of the pressure-sensitive beam of the transducer. The entire assembly is balanced about a sensitive axis passing through the central strip of the differential bending beam so as to render the device substantially insensitive to acceleration forces which might otherwise adversely affect the operation of the transducer.

It is therefore one object of the present invention to provide an improved pressure transducer.

Another object of the present invention is to provide an improved pressure-sensing device in the form of a bending beam.

Another object of the present invention is to provide a pressure-sensing transducer which produces an output indicative of force rather than displacement.

Another object of the present invention is to provide a pressure-sensitive beam in the form of a bellows open at one end and closed at the other end to which is connected at one side a flat flexible metallic strip.

Another object of the present invention is to provide a symmetrical double-bellows bending beam pressure transducer particularly suited for sensing differential pressures.

Another object of the present invention is to provide a pressure-sensitive beam in the form of a bellows to which is connected at one side a flat flexible metallic strip, the bending beam being balanced about a sensitive axis passing through the metal strip.

Another object of the present invention is to provide an improved servo-loop-type pressure transducer incorporating a pressure-sensitive bending beam.

Another object of the present invention is to provide a servo pressure transducer which measures force rather than displacement and which incorporates as a part of the transducer a forcer coil and capacitive pickoff including a movable plate attached to a pressure-sensitive bending beam.

These and further objects and advantages of the invention will be more apparent upon reference to the following specification, claims and appended drawings, wherein:

FIG. 1 is a side view of a bending beam constructed in accordance with the present invention;

FIG. 2 is an end view of the beam of FIG. 1;

FIG. 3 shows the beam of FIGS. 1 and 2 deflected under the influence of both an overpressure and an underpressure;

FIG. 4A is a cross-sectional view and FIG. 4B is an end view of a modified bending beam constructed in accordance with the present invention;

FIG. 5A is a sectional view and FIG. 5B is an end view of a further modified bending beam constructed in accordance with the present invention;

FIG. 6A is a sectional view and FIG. 6B is an end view of a further modified bending beam constructed in accordance with the present invention;

FIG. 7A is a sectional view and FIG. 7B is an end view of a further modified bending beam constructed in accordance with the present invention;

FIG. 8A is a sectional view and FIG. 8B is an end view of a still further modified bending beam constructed in accordance with the present invention;

FIGS. 9A and 9B are side views of a bending beam having a balancing weight attached to it so that the bending beam is balanced about its sensitive axis;

FIG. 10 is a cross-sectional view showing principal components of a servo pressure transducer constructed in accordance with the present invention and incorporating a differential or double-bellows pressure-sensitive beam;

FIG. 11 is an enlarged sectional view of the differential bending beam incorporated in the transducer of FIG. 10;

FIG. 12 is a side view of the differential bending beam incorporated in the transducer of FIG. 10;

FIG. 13 is a view with parts in section taken at right angles to that of FIG. 12 showing the differential bending beam;

FIG. 14 is an end view of the differential bending beam of FIG. 13;

Figure 15:
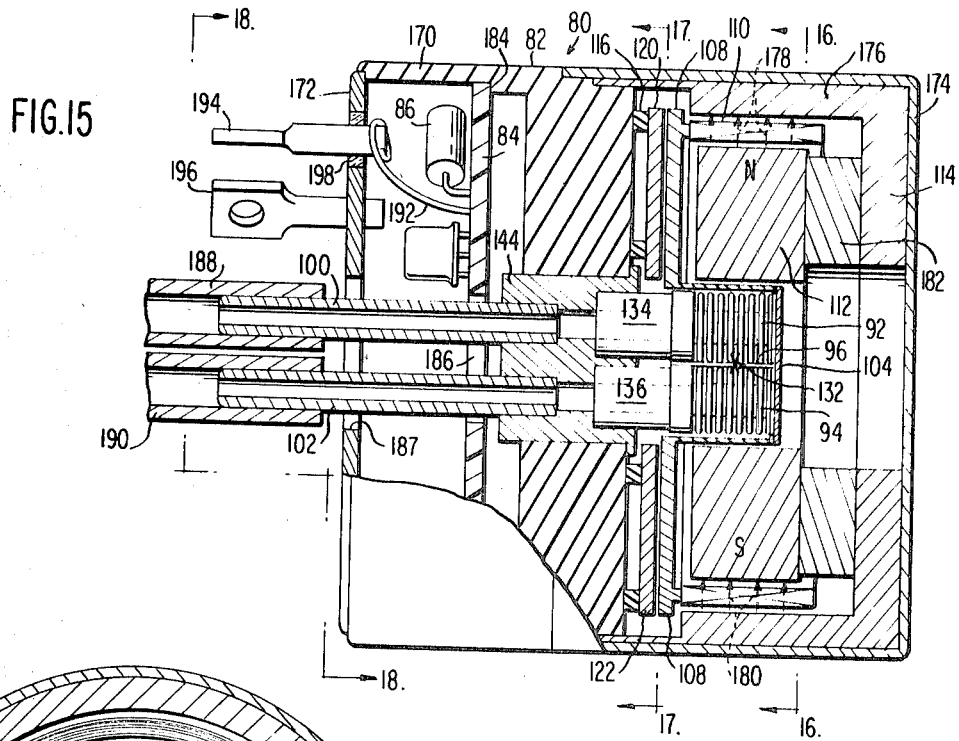
FIG. 15 is a view with parts in section showing an overall servo pressure transducer constructed in accordance with the present invention.
Figure 16:
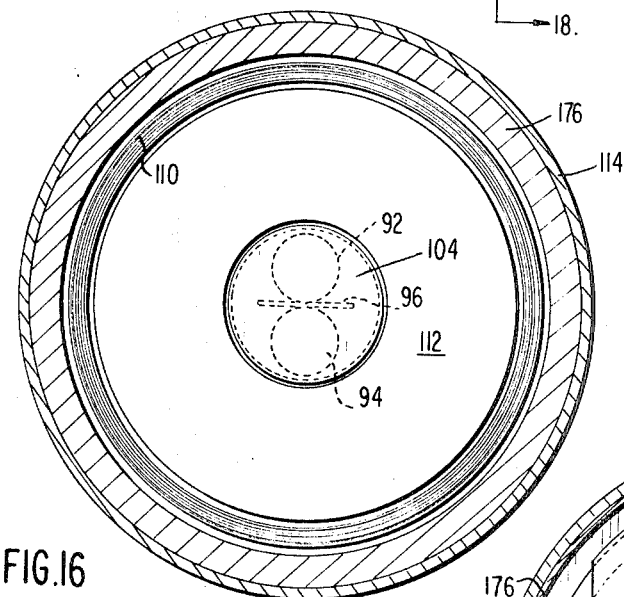
FIG. 16 is a cross section taken along line 16—16 of FIG. 15.

Referring to the drawings, FIG. 1 shows a bending beam constructed in accordance with the present invention generally indicated at 10 and comprising a metal bellows 12 to one side of which is attached a flat, flexible metal strip 14. The bellows is provided with a series of corrugations or convolutions 16 and is closed at one end by a rigid metal end plate 18 which is shown as a separate plug but which may be formed integral with the corrugations. Adjacent corrugations 16 the bellows is provided with a straight tubular section terminating in an open end 22 adapted to receive a pressure fluid such as air, gas, liquid or the like. The bellows and strip are preferably made of the same materials such as a flexible copper alloy or stainless steel. Strip 14 is attached to the circumference of the bellows, i.e., to the other edges of successive corrugations and to tubular section 20 by solder as indicated at 23. Alternatively, strip 14 may be brazed or welded to the corrugations and to the straight section 20 of the bellows. Strip 14 is preferably substantially coextensive with straight section 20 and corrugated portions 16 of the bellows and is attached along substantially its entire length. The strip has a width approximately equal to the diameter of the bellows as illustrated in FIG. 2 and is preferably also joined to the end plate 18 by solder or the like. Strip 14 should have a sufficient thickness to withstand any significant elongation but should be thin enough to readily flex under the application of bending forces resulting from the entrance of pressure fluid through the open end 22 of the bellows.

As can be seen in FIG. 1, the metal strip 14 is anchored at one end to the tubular section 20 and acts as a cantilevered bending beam in conjunction with the corrugated section 16 to which it is attached. This construction makes possible a highly flexible arrangement which will withstand very high pressures and yet is very sensitive to small pressure changes. It is particularly suited for incorporation in a differential system or in a servo force balance system as described below where most or all of the pressure force is bucked out or opposed either by a second bellows or in the case of a servosystem by a restoring electrical or magnetic force.

Strip 14 for good sensitivity is preferably formed of metal and has a thickness no greater than about 0.010 inch. In the preferred embodiment, the thickness is a few thousandths of an inch and bending beams in which the strip 14 has a thickness of 0.003 inch have been found quite satisfactory.

The bellows and end plate are preferably formed of the same material as the strip and through the use of conventional casting or electroplating techniques, the bellows, and plate and strip may all be formed as an integral construction.

Again, for adequate strength and flexibility, the thickness of the material forming the bellows should be no greater than about 0.005 inch and a metal bellows having a thickness of 0.001 inch has been found to be optimum. If the strip or the bellows is made too thick, sensitivity is lost whereas the bellows and strip must have sufficient strength to withstand pressures of as much as tens of atmospheres. For stronger materials, the bellows and strip can be made even thinner, i.e., substantially less than 0.001 inch.

The other dimensions of the bending beam 10 may be varied in accordance with use requirements. By way of example only, for a beam having a strip thickness of 0.003 inch and a bellows with a thickness of 0.001 inch, the diameter of the bellows is preferably one-fourth inch. The length of the bellows for this example (corrugations only) may vary from about one-fourth to one-half inch and the length of the tubular section 20 is approximately equal to the length of the corrugated section 16. As previously mentioned, the width of the strip 14 is preferably approximately equal to the diameter of the bellows, i.e., one-fourth inch so as to provide good lateral stability. The end plate 18 in general has a thickness in the neighborhood of about a quarter of its diameter and for a ¼-inch diameter bellows may have a thickness of about one-eighth to about one-sixteenth inch.

FIG. 3 shows the deflection of the bending beam when subjected both to overpressure and to underpressure. When fluid at a pressure above ambient as indicated by the arrow 24 in FIG. 3 is applied through the open end 22 of the bellows to the interior of the corrugations, the bellows wants to expand linearly but is restrained by the strip 14. As a result the end of the beam deflects in the direction of the strip 14 as indicated by the arrow 16. The amount of angular deflection is proportional to the overpressure within the bellows. Conversely, when the bellows is evacuated to a pressure less than ambient as indicated by the arrow 18 in FIG. 3 then the beam bends in the opposite direction, i.e. toward the side away from strip 14 as indicated by the arrow 30. Again, the amount of deflection is proportional to the difference in pressure between the inside and the outside of the bellows 12.

FIGS. 4A and 4B show a modified bending beam construction wherein the bending beam generally indicated at 32 comprises a bellow 34 in which the corrugations are truncated or flattened along one side as indicated at 36. The omitted portions of the corrugations are illustrated by dash lines at 38. Attached to the truncated portions of the corrugations 34 is a flat strip 40 in all respects identical to the strip 14 of FIG. 1. Thus, in the embodiment of FIGS. 4A and 4B the depths of the corrugations varies about the circumference of the bellows, being deeper on the side remote from strip 40 and shallower on the side to which the strip is attached.

FIGS. 5A and 5B show a further modified bending beam generally indicated at 42 having as a feature in common with the bending beam 32 of FIGS. 4A and 4B that in the embodiment of FIGS. 5A and 5B the corrugations again are deeper on one side of the bellows than on the other. In the embodiment of FIGS. 5A and 5B the bellows 44 have corrugations which taper from a maximum depth as indicated at 46 on the side of the bellows opposite from strip 48 such that the corrugations completely disappear as at 50 on the side to which strip 48 is attached. A variation of this construction is incorporated in the embodiment of FIGS. 6A and 6B showing a bending beam 52 in which the bellows is generally rectangular in cross section and flat on one side to which is attached the strip 54. Here again the corrugations of bellows 56 taper from a maximum thickness at 58 on the side opposite to which strip 54 is attached to a minimum thickness on the straight flat side 60 of the bellows to which the strip 54 is attached. The flat or generally rectangular configuration illustrated in FIGS. 6A and 6B makes it possible to attach or bond the flat strip 54 more easily and more soundly to the bellows.

If a bellows is used where the depths of the corrugations is variable and where corrugations completely disappear on one side of the bellows, then the flexible strip can be omitted altogether. This construction which is similar to the embodiment of FIGS. 5A and 5B is illustrated in FIGS. 7A and 7B. These latter figures show a bending beam 61 in all respects similar to the beam 42 but with the flat strip 48 omitted. A further modified bending beam is illustrated at 62 in FIGS. 8A and 8B where two semicircular bellows 64 and 66 are joined to each other by an intermediate flat strip 68. The flexible strip splits the bellows down the middle and is located right inside the bellows so as to separate or divide it into two separate sealed compartments. The two compartments may be connected to separate inlets to form a differential-pressure-sensitive beam such that the strip 68 deflects toward the bellows section 64 or 66 containing the lesser pressure.

In order to render the bending beam of the present invention more insensitive to acceleration forces it is sometimes desirable to add balancing weights to the beam. An arrangement for doing this is illustrated in FIGS. 9A and 9B where the end plate 18 of the bending beam 10 is connected to a substantially U-shaped balancing weight 70 having a base 72 joined to longitudinally extending arms 74 and 76 such that the bending beam is completely balanced about an axis indicated at 78 in FIG. 9B. That is, the balancing weight 70 is attached to the free end of the bellows in such a way as to compensate effects from gravity or from any transverse acceleration on the output of the beam by statically balancing the movable beam system.

FIG. 10 is a cross section showing the major components of a servo pressure transducer constructed in accordance with the present invention. The servo transducer 80 of FIG. 10 comprises a frame 82 on which is mounted a printed circuit board 84 supporting the electronic components of the system indicate at 86. The frame 82 includes a compartment 88 in which is mounted a pressure-sensitive bending beam generally indicated at 90. The beam 90 is of the differential type and includes a pair of bellows 92 and 94 symmetrically arranged on opposite sides of a flat metal strip 96. The strip is secured to the outer edge of each of the corrugations of the bellows 92 and 94 and is cantilevered at its end to the frame 82 as indicated at 98. Pressure fluid is supplied to bellows 92 and 94 from the respective pressure fluid inlets 100 and 102.

Attached to the bellows end plates as more clearly seen in FIG. 11 is the base 104 of a circular cup 106 which cup has an integral laterally extending annular flange 108 serving as the movable plate of a capacitive pickoff. Attached to movable plate 108 and carried by it is an annular forcer coil 110. The forcer coil surrounds an annular magnet 112 which is linearly polarized in the plane of the paper in FIG. 10 so that the opposite sides of the coil 110 cut magnetic lines of flux extending outwardly from magnet 112. An annular ring or keeper 114 of soft iron provides a return path for the flux from the magnet 112. The flux path of the magnetic circuit is from the north pole of the magnet through the adjacent wires of coil 110 and through both arms of annular ring 114 and by way of the opposite side of the coil to the south pole of the magnet. Annular magnets having linear polarization are well known and further description is deemed unwarranted.

Mounted by electrical insulator rings 116 and 118 are a pair of capacitor plates 120 and 122 forming the stationary plates of a differential capacitor pickoff for the servo transducer. Coil 110 is connected to the electronic circuit 86 by a pair of flexible leads 124 and 126. Stationary plates 120 and 122 are similarly connected to the electronics by a pair of transducer leads 128 and 129. Movable capacitor plate 108 is connected through cup 106 and the strip and bellows to grounded frame 82 and by way of lead 130 to the electronic circuit 86. Cup 106 with its internal flange and connected coil 110 form a moving system which is balanced about a sensitive axis 132 in FIG. 10 to render the system substantially insensitive to acceleration forces. Sensitive axis 132 passes through the center of gravity of the balanced system which balancing is made possible by the longitudinally extending arms of the cup so that the movable plate 108 and portions of the coil 110 lie below axis 132 while other parts of the movable assembly lie above this axis. The bellows itself, the cup, movable plate 108 and coil 110 are all of circular configuration so as to provide a center of gravity for the system along the center of strip 96 and coincident with the sensitive or flexing axis 132 of the bending beam.

FIGS. 12, 13, and 14 are a more detailed showing of the assembly for the bending beam 90. FIG. 12 is a side view of the bending beam. FIG. 13 is a plan view with parts in section and FIG. 14 is an end view showing the base 104 of the cup 106. Metallic strip 96 is positioned between the two bellows 92 and 94. The ends of the bellows slip over the ends of a pair of tubular sections 134 and 136 as at 138 and 140. The ends 138 and 140 of the bellows are secured to the respective tubular sections 134 and 136 by soldering, brazing, or the like. At the same time, the end of metal strip 196 is soldered or brazed to the portions 138 and 140 of the bellows received over the tubular sections as at 142 so that the strip 96 is anchored or cantilevered at its end 98 to the end of the bellows and therefore to the rigid support formed by tubular sections 134 and 136. The opposite ends of the tubular sections are in turn received in circular cavities formed in a bushing 144 provided with an integral mounting flange 146. Tubes 132 and 136 are soldered or brazed to the bushing as at 148 and 150.

Sections 134 and 136 are provided with central circular channels 152 and 154 which communicate at one end with the interior of bellows 92 and 94 and at its other end with a similar-size channel 156 and 158 in bushing 144. The opposite ends of these latter channels are enlarged as at 160 and 162 to receive the ends of supply tubes 100 and 102 which are likewise soldered or brazed to bushing 144 at 164 and 166. Thus, fluid communication with the interior of the bellows is by way of the supply tubes 100 and 102 through the channels 156 and 158 in the bushing and the channels 152 and 154 in tubular sections 134 and 136. The outer diameter of tubular sections 134 and 136 are preferably slightly less than the outer diameter of the bellows corrugations so that the end of the bellows 138 and 140 fit over the tubular sections 134 and 136 with an outer diameter equal to the outer diameter of the corrugations such that strip 96 lies completely straight and flat between the bellows and is anchored to the bellows ends at 142.

FIG. 15 is a more detailed showing of the servo transducer illustrated generally in FIG. 10. In FIG. 14, 5, the transducer 80 includes a three-part housing 82 comprising a body of electrical insulating material 170 such as ceramic closed off at one end by a header 172 and at its other end by a cover 174. Soft iron keeper 114 takes the form of an annular cup with ring portion 176 surrounding coil 110. The lines of flux from the north pole of the magnet to ring 114 are indicated by dash lines at 178 and the flux path return is similarly indicated by the dash lines 180. Magnet 112 is mounted on ring 114 but is spaced from it by an annular spacer 182.

Circuit board 84 is mounted on a shoulder 184 of ceramic body 170 and includes a central aperture 186 passing the supply tubes 100 and 102. These supply tubes are received in the ends of supply lines 188 and 190 connected to the source or sources of pressure to be measured. Finally passing through the header and connected to the electrical circuit by leads such as lead 192 in FIG. 15 are terminals 194 and 196, the former shown as electrically insulated from header 172 by an insulating bushing 198.

Figure 17:
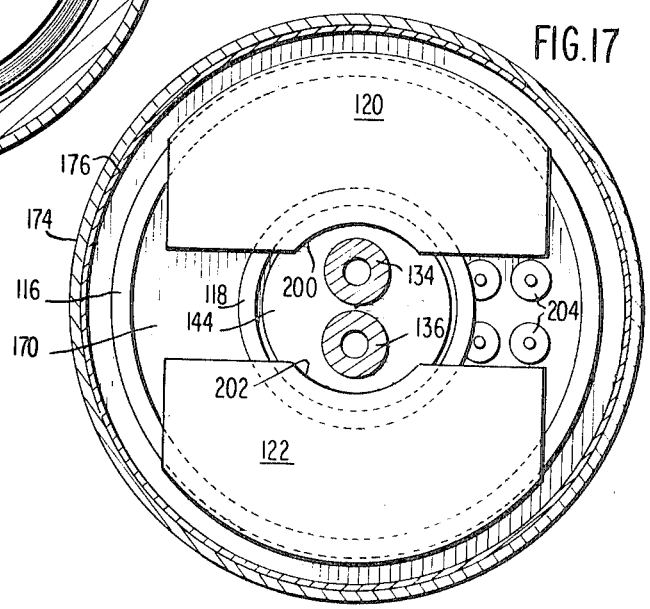
FIG. 17 is a cross section taken along line 17—17 of FIG. 15.
Figure 18:
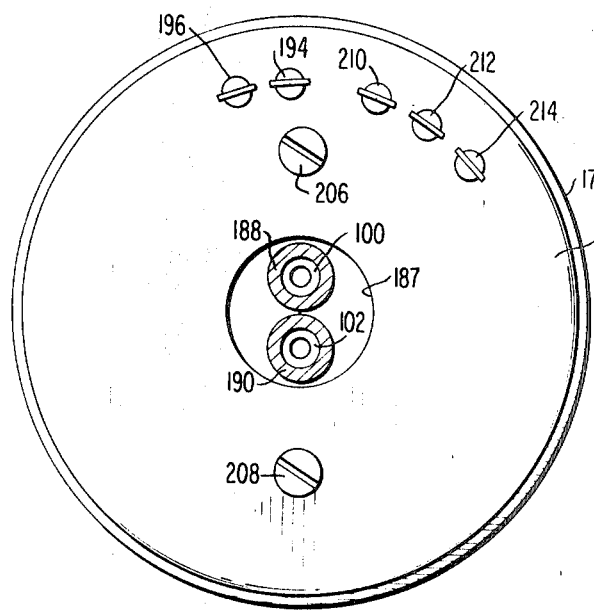
FIG. 18 is a cross section taken along line 18—18 of FIG. 15.

Referring to FIG. 17, it can be seen from that figure that the fixed plates 120 and 122 are not annular but instead arcuate along their outer edges and are cut away at the centers such as at 200 and 202 to provide clearance for the tubular sections 134 and 136. Also illustrated in FIG. 17 are four feed through terminals 204 mounted in the insulating or ceramic body 170 for connecting from the electronic circuit on circuit board 184 to the coil and capacitor plates. FIG. 18 is an end view of the header 172 and show the header screws 206 and 208 and three additional electrical terminals 210, 212 and 214 for establishing electrical connection between the transducer and external circuits.

Figure 19:
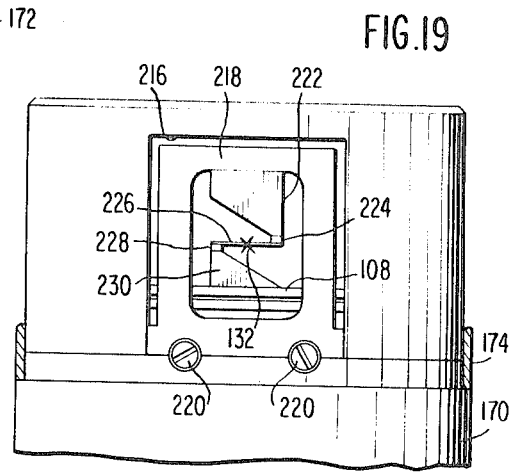
FIG. 19 is an elevational view showing a pressure transducer incorporating a modified suspension system in accordance with the present invention.

FIG. 19 shows a modification in which the moving plate is suspended in a cross spring suspension system. In this modified embodiment, the soft iron cup or ring 114 is cut away on diametrically opposite sides to form a pair of windows one of which is indicated at 216 in FIG. 19. Positioned in each of the windows is a frame such as the frame 218 secured to body or base 170 by screws 220. Each frame is thus rigidly mounted to the body and depending from it is a suspension block 222 and mounting block 224. Mounting block 224 is attached to a flat metal spring 226 the other end of which is secured to a second mounting block 228 on a second suspension block 230. This latter block is attached to one side of moving plate 108 of the capacitive pickoff. While only one suspension wire 226 is shown, it is understood that a similar suspension system and wire is provided in the diametrically opposite side of ring 114 and similarly connected to the opposite side of moving plate 108. The two springs corresponding to spring 226 in conjunction with the metal strip 96 of the bellows form a three-beam cross spring suspension system for moving plate 108 for movement about the system axis 132. That is, the center of spring 226 and its diametrically opposite companion spring are mounted so that they lie in the plane of the system axis 132 of bending beam strip 96 which axis passes through the midpoint of the suspension springs. This modified or cross spring suspension system further aids in rendering the pressure transducer less sensitive to acceleration forces.

Figure 21:
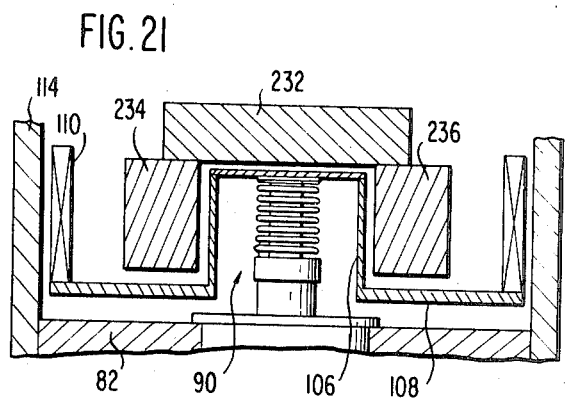
FIG. 21 is a cross-sectional view showing the modified magnetic circuit of FIG. 20.
Figure 20:
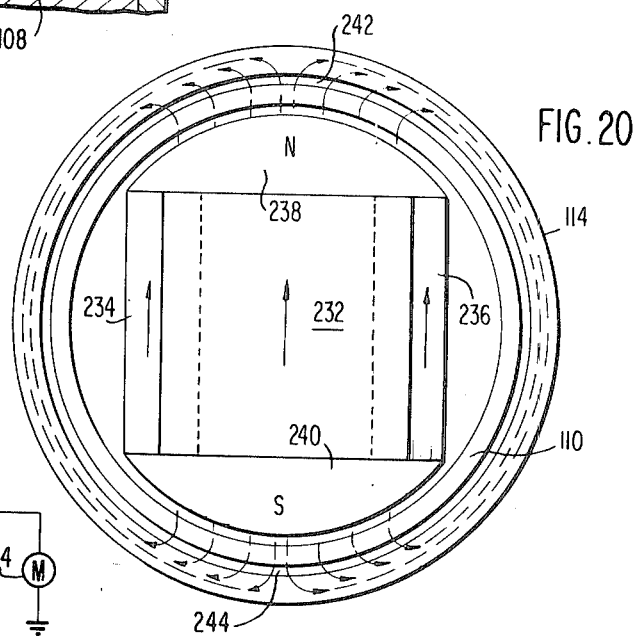
FIG. 20 is a plan view of a modified magnetic circuit for the pressure transducer of FIG. 15.

FIGS. 20 and 21 show a modified magnetic circuit for the transducer. As before, the bending beam 90 is mounted to frame 82 and carries the cup 106 and movable plate 108 on which is mounted the annular coil 110. Extending transversely of the device are three bar magnets 232, 234 and 236 to the ends of which are attached the pole pieces 238 and 240. Magnets 232, 234, and 236 are all polarized with the same polarity so that adjacent ends of the magnets are similarly polarized and provide north and south poles at the pole pieces 238 and 240. These pole pieces in conjunction with the soft iron ring 114 provide airgaps 242 and 244 for the magnetic flux from the magnets which flux is indicated by the dashline arrows in FIG. 20. This flux flows from the north pole across airgap 242 and back along both sides of ring 114 and through airgap 244 to the south pole piece 240 of the magnets. A portion of the turns of coil 110 is of course positioned in the airgaps 242 and 244 such that when current passes through the forcer coil 110 and through its turns a restoring torque is exerted on the coil which is transmitted through the movable plate of the capacitor to the free end of the pressure-sensitive beam 90.

Figure 22:
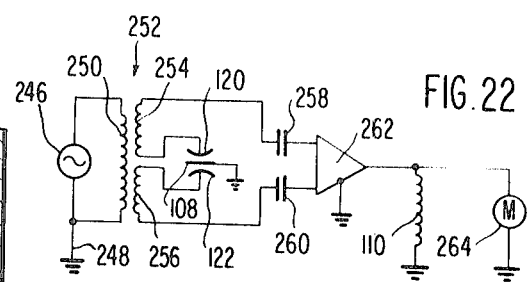
FIG. 22 shows a circuit diagram for the force balance servo pressure transducer of FIG. 15.

FIG. 22 is a simplified circuit diagram for the servo transducer of FIG. 15. The circuit comprises an AC source or generator 246 operating by way of example only at a frequency of about 6 megahertz. One side of source 246 is grounded as at 248 and connected across it is the primary 250 of an isolating transformer 252. Transformer 252 is provided with two secondary windings 254 and 256, one side of the transformer secondaries being connected through the capacitors 258 and 260 to the inputs of a differential amplifier 262. The output of amplifier 262 is proportional to the difference between the signals at its two inputs and the amplifier develops an output signal causing current to flow through the forcer coil 110, the amount of this current being indicated by a meter 264. The other sides of the transformer secondaries 254 and 256 are connected to the stationary plates 120 and 122 which form the stationary plates of a differential capacitor having the moving plate 108 which is grounded.

When plate 108 is in its center position, the signals on the secondary windings of the transformer are balanced and no signal is developed at the output of amplifier 262. However, as movable capacitor plate 108 tends to move with a deflection of the bending beam under pressure an unbalance in the signal between the two inputs of the amplifier 262 occurs and a signal is developed at the output of the amplifier in the form of a current through forcer coil 110 which opposes the force causing the deflection of the bending beam tending to restore capacitor plate 108 to its initial position. The amount of current flowing through forcer coil 110 to produce a force balance condition in the transducer is proportional to the pressure differential in the two bellows of the bending beam 90 and the amount of this current is indicated by meter 264 which gives a direct indication of the differential pressure.

Figure 23:
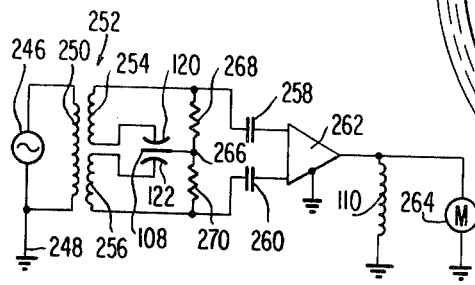
FIG. 23 is a circuit diagram for a modified transducer constructed in accordance with this invention.

FIG. 23 shows a circuit diagram of a modified circuit for the transducer of FIG. 15. In FIG. 23 like parts bear like reference numerals and the circuit of FIG. 23 is similar to the circuit of FIG. 22 described above with the exception that the moving plate 108 is not grounded but instead is returned to a terminal 266, i.e., is returned to the midpoint between a pair of resistors 268 and 270 connected across the differential capacitor. Resistors 268 and 270 are provided in the circuit of FIG. 23 to take the DC leakage off the plates of the differential capacitor.

It is apparent from the above that the present invention provides an improved pressure-sensitive beam and an improved servo pressure transducer construction incorporating the beam. The pressure-sensitive beam can in a sense be compared to a bimetal strip since it bends or deflects under pressure in the manner of a bimetal strip which bends or deflects under the influence of temperature. The beam may take several different forms, such as those illustrated in FIGS. 1 through 8, but in the preferred construction the beam comprises a flat metal strip with two opposed bellows attached to it, one on each side in a perfectly symmetrical arrangement. The pressure-sensitive beam offers important advantages over previous constructions in that it can be made extremely flexible and still resist very high pressures. When incorporated in a servo pressure transducer of the type disclosed, the instrument can respond to even a few millionths of atmosphere while still being able to measure several hundred p.s.i. Since the bellows in the differential construction tend to remain substantially straight, the bellows are not subject to the tendency to buckle under high internal pressure. Because the beam generates a bending motion rather than a linear displacement, it can be made substantially less acceleration sensitive than a straight bellows, particularly when incorporating weights to balance it about its sensitive axis and to adjust its center of gravity to coincide with that axis.

The symmetrical-balance-type bending beam represents an ideal differential pressure sensor since it remains substantially straight even when high pressures are applied at the two inlets as long as those pressures are substantially equal. Only a very slight difference between the two pressures causes the beam to readily deflect a small amount because of its great flexibility. The bending beam since it is very flexible or "soft" is highly sensitive to even the smallest changes in pressure. When incorporated in a servo or force balance arrangement, the bending force is opposed by the restoring force of the current flowing through the forcer coil so that the device measures pressure directly in that pressure is converted to force rather than to displacement as with prior constructions. That is the amount of deflection or movement is minimal because of the opposing force of the coil and hence the reading on the output meter 264 is substantially independent of the materials from which the beam is made and is directly related to the amount of force applied to the beam resulting from the differential or change in pressure. This is distinguishable from prior deflecting bellows constructions in which the deflection is not only related to force but also related to the mechanical resistance or spring factor of the material from which the bellows is constructed. In the present invention, the bellows and metal strip are made quite thin and easily flex so that deflection is almost entirely due to force and any mechanical resistance or spring reaction tending to resist the deflection force is minimized.

What is claimed and desired to be secured by United States Letters Patent is:

1. A servo pressure transducer comprising a pressure-sensitive bending beam, means coupled to said bending beam for developing an electrical signal indicative of the deflection of said beam in response to a pressure fluid acting on said beam, and torquing means coupled to said beam for applying a torque to said beam in such a direction as to resist said deflection, said torquing means acting in a force balance servo loop to maintain said beam substantially straight, said bending beam being cantilevered at one end and having its other end free, said electrical-signal-developing means being coupled to the free end of said beam.

2. A servo pressure transducer comprising a pressure-sensitive bending beam, means coupled to said bending beam for developing an electrical signal indicative of the deflection of said beam in response to a pressure fluid acting on said beam, and torquing means coupled to said beam for applying a torque to said beam in such a direction as to resist said deflection, said torquing means acting in a force balance servo loop to maintain said beam substantially straight, said beam comprising a bellows open at one end and closed at the other, and a flat flexible strip secured to the successive corrugations along one side of said bellows.

3. A servo pressure transducer according to claim 2 including a second bellows symmetrically secured to the other side of said strip.

4. A servo pressure transducer comprising a pressure-sensitive bending beam cantilevered at one end and having its other end free, a variable electrical impedance adjacent said free end of said beam and variable in accordance with the deflection of said beam, a forcer coil carried by the free end of said beam and an electrical power source coupled to said impedance and to said forcer coil for feeding a signal to said forcer coil indicative of the value of said impedance.

5. A servo pressure transducer according to claim 4 wherein said impedance comprises a capacitive pickoff.

6. A servo pressure transducer comprising a flat, flexible metal strip, a pair of bellows each having an open end and a closed end symmetrically secured to opposite sides of said strip, said bellows and strip being cantilevered at the open end of said bellows and being free at the closed end of said bellows, a cup forming a movable capacitor plate mounted on the free end of said bellows, a forcer coil carried by said cup, at least one fixed capacitor plate adjacent to but spaced from said cup, a permanent magnet adjacent said coil, a portion of said coil lying in the flux path of said permanent magnet, an electrical power source coupled to said forcer coil and said capacitor plates, and means for feeding an electrical signal from said capacitor plates to said forcer coil proportional to the change of capacitance formed by said plates.

7. A servo pressure transducer according to claim 6 wherein said bellows, cup and coil are all balanced to have a center of gravity in the plane of said strip approximately midway of its length.

8. A servo transducer according to claim 7 including a support, and a pair of crossed springs mounting said movable capacitor plate to said support, said springs being flexible about an axis passing through said center of gravity.

9. A servo pressure transducer according to claim 6 wherein said permanent magnet comprises a linear magnetized annular magnet within said coil, and an annular magnetic keeper of soft iron surrounding said coil.

10. A servo pressure transducer according to claim 6 including a plurality of permanent bar magnets within said coil.

UNITED STATES PATENT OFFICE
CERTIFICATE OF CORRECTION

Patent No. 3,602,047      Dated August 31, 1971

Inventor(s) Walter P. Kistler

It is certified that error appears in the above-identified patent and that said Letters Patent are hereby corrected as shown below:

Column 3, line 40, "section" should read --section 20--.
Column 4, line 40, "arrow 18" should read --arrow 28--.
Column 4, line 47, "bellow" should read --bellows--.
Column 5, line 35, "indicate" should read --indicated--
Column 6, line 46, "Fig. 14,5" should read --Fig. 15--
Column 6, line 74, "show" should read --shows--.

Signed and sealed this 21st day of March 1972.

(SEAL)
Attest:

EDWARD M. FLETCHER, JR.
Attesting Officer

ROBERT GOTTSCHALK
Commissioner of Patents